US012576693B2

(12) United States Patent
Lohan et al.

(10) Patent No.: US 12,576,693 B2
(45) Date of Patent: Mar. 17, 2026

(54) COOLING SYSTEMS AND ASSEMBLIES, AND VEHICLES INCLUDING THE SAME

(71) Applicant: Toyota Motor Engineering & Manufacturing North America, Inc., Plano, TX (US)

(72) Inventors: Danny J. Lohan, Northville, MI (US); Shailesh N. Joshi, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 180 days.

(21) Appl. No.: 18/411,628

(22) Filed: Jan. 12, 2024

(65) Prior Publication Data

US 2025/0229604 A1 Jul. 17, 2025

(51) Int. Cl.
B60H 1/32 (2006.01)

(52) U.S. Cl.
CPC .................................. B60H 1/3202 (2013.01)

(58) Field of Classification Search
CPC ... B60H 1/3202; F28D 15/043; H01L 23/427; H05K 7/20881; F28F 2250/08
See application file for complete search history.

(56) References Cited

U.S. PATENT DOCUMENTS

| | | | |
|---|---|---|---|
| 5,209,078 A | | 5/1993 | Conrad et al. |
| 6,082,443 A | * | 7/2000 | Yamamoto ............ F28D 15/046 |
| | | | 174/15.2 |

| | | | |
|---|---|---|---|
| 6,827,134 B1 | | 12/2004 | Rightley et al. |
| 7,265,979 B2 | * | 9/2007 | Erturk ................ H05K 7/20363 |
| | | | 257/713 |
| 9,179,575 B1 | * | 11/2015 | Yao ........................... H05K 7/20 |
| 12,185,511 B2 | * | 12/2024 | Joshi .......................... F28F 3/12 |
| 2004/0104012 A1 | * | 6/2004 | Zhou ..................... H01L 23/427 |
| | | | 257/E23.088 |
| 2004/0196633 A1 | * | 10/2004 | Wong .................... F28D 15/043 |
| | | | 257/E23.088 |
| 2007/0175615 A1 | * | 8/2007 | Li .......................... H01L 23/427 |
| | | | 257/E23.088 |

(Continued)

FOREIGN PATENT DOCUMENTS

| | | |
|---|---|---|
| CN | 101242729 A | 8/2008 |
| CN | 100495692 C | 6/2009 |

(Continued)

*Primary Examiner* — Nelson J Nieves

(74) *Attorney, Agent, or Firm* — Dinsmore & Shohl LLP

(57) ABSTRACT

A pump-assisted cooling system including a pump, a fluid feed line, a fluid bypass line, a heat exchanger, and a cooler assembly. The cooler assembly includes one or more heat generating devices, a housing, a fluid inlet and outlet, a fluid pathway, a vaporization structure, a condenser, and a condenser outlet line. The fluid pathway within the housing is fluidly coupled to the fluid inlet and outlet. The vaporization structure includes a plurality of feeding tubes fluidly coupled to the fluid pathway, a wick, and one or more vapor outlets. The condenser is housed within the housing. The vaporization structure induces vaporization of a cooling fluid and facilitates vapor flow into the condenser. The condenser induces condensation of the cooling fluid, the cooling fluid rejoins the fluid bypass line through the condenser outlet line positioned distal to the condenser.

20 Claims, 8 Drawing Sheets

(56)            References Cited

U.S. PATENT DOCUMENTS

| 2010/0300656 | A1* | 12/2010 | Lu ......................... F28D 15/043 |
| | | | 165/104.26 |
| 2011/0049976 | A1* | 3/2011 | Suzuki ................... H05K 7/203 |
| | | | 307/9.1 |
| 2013/0042603 | A1* | 2/2013 | Newman ............ B60H 1/00421 |
| | | | 60/407 |
| 2014/0196498 | A1* | 7/2014 | Xiao ...................... F25B 39/02 |
| | | | 62/524 |
| 2016/0332506 | A1* | 11/2016 | Rubitschek .............. B60H 1/20 |
| 2017/0146273 | A1* | 5/2017 | Spitzner ............. H05K 7/20336 |
| 2018/0077826 | A1* | 3/2018 | Okita ...................... B64C 25/36 |
| 2020/0101817 | A1 | 4/2020 | Ohlhoff et al. |
| 2022/0065549 | A1* | 3/2022 | Zhou .................. F28D 15/0275 |
| 2022/0090866 | A1* | 3/2022 | Haruki ................... F28D 15/06 |
| 2022/0167528 | A1* | 5/2022 | Joshi .................. H05K 7/20936 |
| 2022/0192060 | A1* | 6/2022 | Joshi .................. H01L 23/3733 |
| 2022/0319956 | A1* | 10/2022 | Joshi .................... H01L 23/427 |
| 2024/0381595 | A1* | 11/2024 | Song ................. H05K 7/20318 |
| 2025/0248011 | A1* | 7/2025 | Sun ......................... H05K 7/20 |

FOREIGN PATENT DOCUMENTS

| CN | 108777338 | B | 11/2018 |
| CN | 111076564 | A | 4/2020 |
| EP | 3633309 | A1 | 4/2020 |
| JP | 4397676 | B2 | 1/2010 |

* cited by examiner

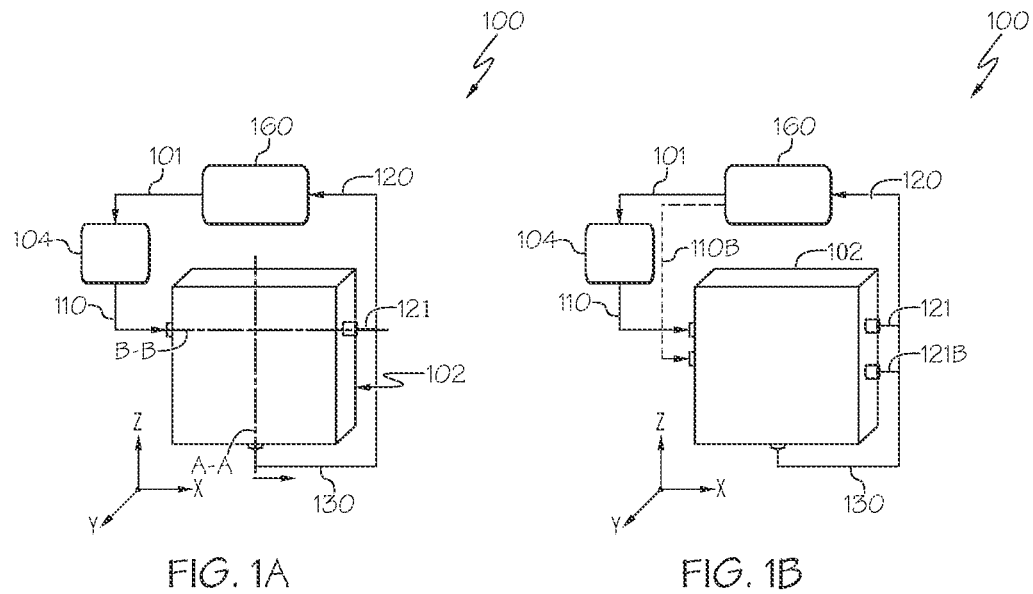
FIG. 1A                       FIG. 1B

COOLING SYSTEMS AND ASSEMBLIES, AND VEHICLES INCLUDING THE SAME

TECHNICAL FIELD

The present specification generally relates to a cooling assemblies and, more specifically, to pump-assisted capillary cooler with integrated condenser for cooling heat generating devices.

BACKGROUND

Pump-assisted capillary cooling is a cooling technique combining capillary action and active pumping to efficiently dissipate heat from electronic or mechanical devices. The approach aims to achieve effective cooling while minimizing the amount of energy required to circulate the cooling fluid. This technique is particularly relevant in applications where energy efficiency and effective heat dissipation are critical, such as high-performance computing, electronics, and high voltage electronic vehicles.

Currently, pump-assisted capillary coolers have been demonstrated utilizing a flow loop, in which vapor generated by the test have been condensed in a separate condenser. This configuration presents challenges where there is a need to integrate the condenser within limited spaces, for example a vehicle.

Accordingly, a need exists for alternative pump-assisted capillary coolers with a condenser to provide minimum disruption for integration while cooling heat generating devices.

SUMMARY

In one embodiment, a pump-assisted cooling system includes a pump, a fluid feed line, a fluid bypass line, a heat exchanger, and a cooler assembly. The heat exchanger is fluidly coupled to the pump. The cooler assembly includes one or more heat generating devices, a housing, a fluid inlet, a fluid outlet, a fluid pathway, a vaporization structure, a condenser, and a condenser outlet line. The one or more heat generating devices are thermally coupled to the housing. The housing includes the fluid inlet and the fluid outlet fluidly coupled to the pump and the heat exchanger via the fluid feed line and the fluid bypass line respectively. The fluid pathway is housed within the housing and is fluidly coupled to the fluid inlet and the fluid outlet. The vaporization structure includes a plurality of feeding tube fluidly coupled to the fluid pathway, a wick, and one or more vapor outlets. The condenser is housed within the housing. The condenser outlet line is positioned distal to the condenser and fluidly coupled to the fluid bypass line. The vaporization structure is configured to induce vaporization of the cooling fluid and facilitate vapor flow into the condenser. The condenser is configured to induce condensation of the cooling fluid wherein the cooling fluid rejoins the fluid bypass line through the condenser outlet line.

In another embodiment, capillary cooler assembly includes a housing, one or more heat generating devices, a fluid pathway, a vaporization structure, a condenser, and a condenser outlet line. The housing includes a fluid inlet and a fluid outlet. The one or more heat generating devices is thermally coupled to a housing. The fluid pathway is housed within the housing and is fluidly coupled to the fluid inlet and the fluid outlet. The fluid pathway is operable to receive a cooling fluid. The vaporization structure within the housing includes a plurality of feeding tubes fluidly coupled to the fluid pathway, a wick, and one or more vapor outlets. The condenser is housed within the housing. The vaporization structure induces vaporization of the cooling fluid and facilitate vapor flow into the condenser. The condenser induces condensation of the cooling fluid wherein the cooling fluid rejoins a liquid bypass line through the condenser outlet line.

In yet another embodiment, a vehicle includes one or more heat generating devices, a pump, a fluid feed line, a fluid bypass line, a heat exchanger, and a cooler assembly. The heat exchanger is fluidly coupled to the pump. The cooler assembly includes a housing, a fluid inlet, a fluid outlet, a fluid pathway, a vaporization structure, a condenser, and a condenser outlet line. The housing includes the fluid inlet and the fluid outlet fluidly coupled to the pump and the heat exchanger via the fluid feed line and the fluid bypass line respectively. The fluid pathway is housed within the housing and is fluidly coupled to the fluid inlet and the fluid outlet. The vaporization structure includes a plurality of feeding tube fluidly coupled to the fluid pathway, a wick, and one or more vapor outlets. The condenser is housed within the housing. The condenser outlet line is positioned distal to the condenser and fluidly coupled to the fluid bypass line. The vaporization structure is configured to induce vaporization of the cooling fluid and facilitate vapor flow into the condenser. The condenser is configured to induce condensation of the cooling fluid wherein the cooling fluid rejoins the fluid bypass line through the condenser outlet line.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1A schematically depicts a pump-assisted cooling system according to one or more embodiments shown and described herein;

FIG. 1B schematically depicts a pump-assisted cooling system according to one or more embodiments shown and described herein;

DETAILED DESCRIPTION

Figures 1C, 1D:
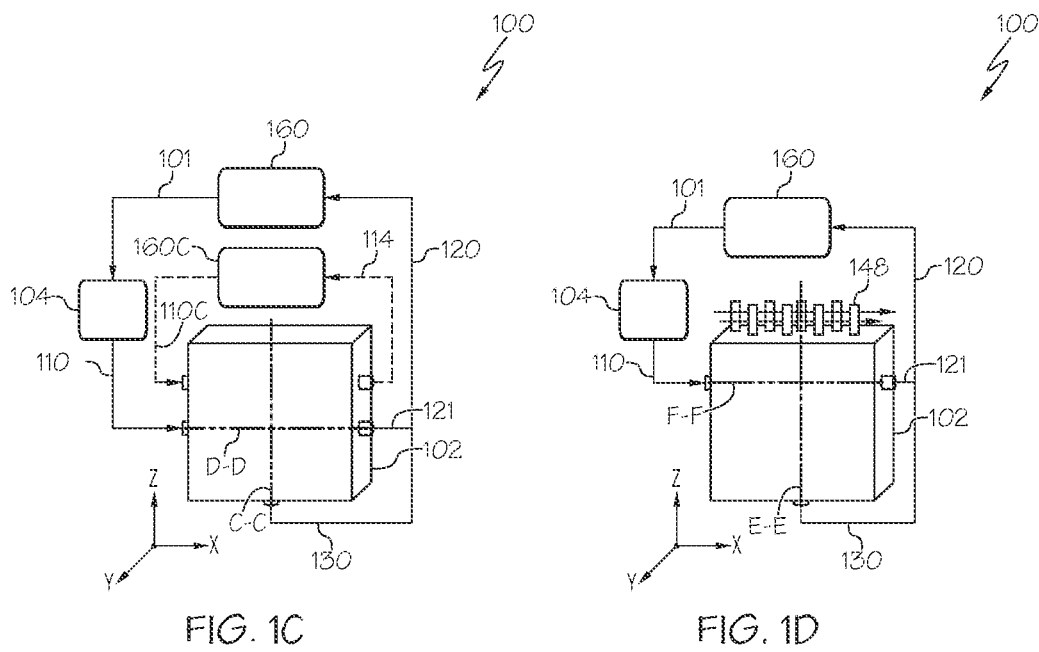
FIG. 1C schematically depicts a pump-assisted cooling system according to one or more embodiments shown and described herein.
FIG. 1D schematically depicts a pump-assisted cooling system according to one or more embodiments shown and described herein.

Embodiments disclosed herein include systems and methods that include a pump assisted cooling assembly for cooling one or more heat generating devices, such as power electronic components of an electric vehicle. The cooler assembly includes a housing with a fluid inlet and a fluid outlet. The fluid inlet and fluid outlet are coupled to a fluid pathway housed within the housing, a pump, and a heat exchanger. The pump assists the cooling fluid to move through the cooler assembly and the heat exchanger. The pump further assists moving the cooling fluid through the housing through the fluid inlet and the fluid outlet, and through a fluid pathway that is within the housing.

A vaporization structure is provided in the housing that includes a plurality of feeding tubes that are fluidly coupled to the fluid pathway, a wick, and one or more vapor outlets. Additionally within the housing is a condenser and a condenser outlet line fluidly coupled to a fluid bypass line, which is connected to the fluid outlet. Fluid moves from the fluid pathway and into the vaporization structure by moving through the feeding tubes, and into the wicks. From the wicks, the fluid vaporizes. The vapor moves into the condenser using vapor outlets wherein the vapor condenses into fluid and exits through the condenser outlet, therefore rejoining the fluid bypass line wherein the pump can continue to pump the fluid back into the heat exchanger.

Thus, the condenser is integrated into the pump assisted cooler to provide minimum system level disruption. In embodiments, the integrated system achieves high cooling performance while maintaining low pumping power or pressure requirements. Additionally, the system can be integrated into existing vehicles allowing for cheaper and easier integration as no new components are needed. In embodiments, the condenser may use a lattice structure to increase condensation. In embodiments, the integrated system may have two fluid inlets and three fluid outlets allowing for a cold coolant to assist condensation. In embodiments, fin structures may be used to provide additional cooling to the condenser. Various embodiments of the cooling system for cooling electronic devices are described in more detail herein. Whenever possible, the same reference numerals will be used throughout the drawings to refer to the same or like parts.

The term "evaporator" refers to the portion of the system where fluid is converted from a fluid to a gas, absorbing heat. The term "condenser" refers to the portion of the system where gas is converted from a gas to a fluid, releasing heat.

Referring now to FIGS. 1A-1D, example embodiments of systems 100 for cooling electronic devices are shown. The system 100 generally includes a capillary cooler assembly 102, a pump 104 for assisting in providing fluid to the cooler assembly 102 and a heat exchanger 160. The components of the system 100 of FIGS. 1A-1D are fluidly coupled by various fluid lines 101. A fluid feed line 110 fluidly couples an output of the pump 104 to an input of the cooler assembly 102 and into a fluid pathway 111 (FIG. 2A). Thus, the pump 104 assists in moving liquid cooling fluid to the cooler assembly 102.

As a non-limiting example, the pump 104 may be a positive-displacement pump, centrifugal pump, axial-flow pump, or any other suitable type of pump. Note that while one pump 104 is shown in FIGS. 1A-1D, any number of pumps can be used. As stated above, the pump 104 is configured to move fluid within the fluid feed line 110. The fluid may be, without limitation, water, glycol-water solutions, dielectric fluid, or any other fluid suitable for cooling electronic devices.

The fluid feed line 110 is coupled to the cooler assembly 102, which is thermally coupled to the one or more heat generating devices 107 (FIGS. 2A-4B). The fluid flowing into the cooler assembly 102 thus cools the heat generating device 107. The one or more heat generating devices 107 may be central processing units, graphical processing units, power electronics devices (e.g., insulated metal-gate bi-polar transistors (IGBT), metal-oxide semiconductor field-effect transistors (MOSFET), and the like), or any other electronic devices that may require cooling.

As described in more detail below with respect to FIGS. 2A-4B the heat generated by the heat generating device 107 may evaporate the fluid as the fluid passes over the heat generating device 107. In yet further embodiments, the cooling system 100 may be arranged in an automobile for cooling an onboard heat generating device 107. The automobile may be an electric vehicle, an internal combustion vehicle, a hybrid vehicle, a fuel cell vehicle, or any other type of automobile. The onboard heat generating device 107 may be an electric motor, battery pack, charging system, inverter circuits, including power electronic devices such as IGBTs or MOSFETS, or any other heat generating device 107 with variable power utilization.

Still referring to FIG. 1A, a fluid bypass line 120 fluidly couples the cooler assembly 102 to an input of the heat exchanger 160. The heat exchanger 160 removes heat collected by the cooling fluid before the cooling fluid reenters the pump 104. A fluid outlet line 121 fluidly couples the cooler assembly 102 from the fluid pathway 111 to the fluid outlet line 121. A condenser outlet line 130 fluidly couples a condenser 150 (FIG. 2A-2B) housed within the cooler assembly 102 to the fluid bypass line 120. The fluid outlet line 121 and the condenser outlet line 130 return the cooling fluid into the fluid bypass line 120 to the heat exchanger 160, where the fluid may be additionally cooled and return to the pump.

Referring now to FIG. 1B, in some embodiments, the cooling system 100 may include a second fluid feed line 110B that feeds into a second fluid pathway 113 (FIG. 3A-3B) from the heat exchanger 160. The cooling fluid is fed through the second fluid pathway 113 from the second fluid feed line 110B to provide additional cooling to the condenser 150, as described in greater detail below, and exits out of a second fluid outlet line 121B. The second fluid outline 121B is fluidly coupled to the fluid bypass line 120.

Figure 2A:
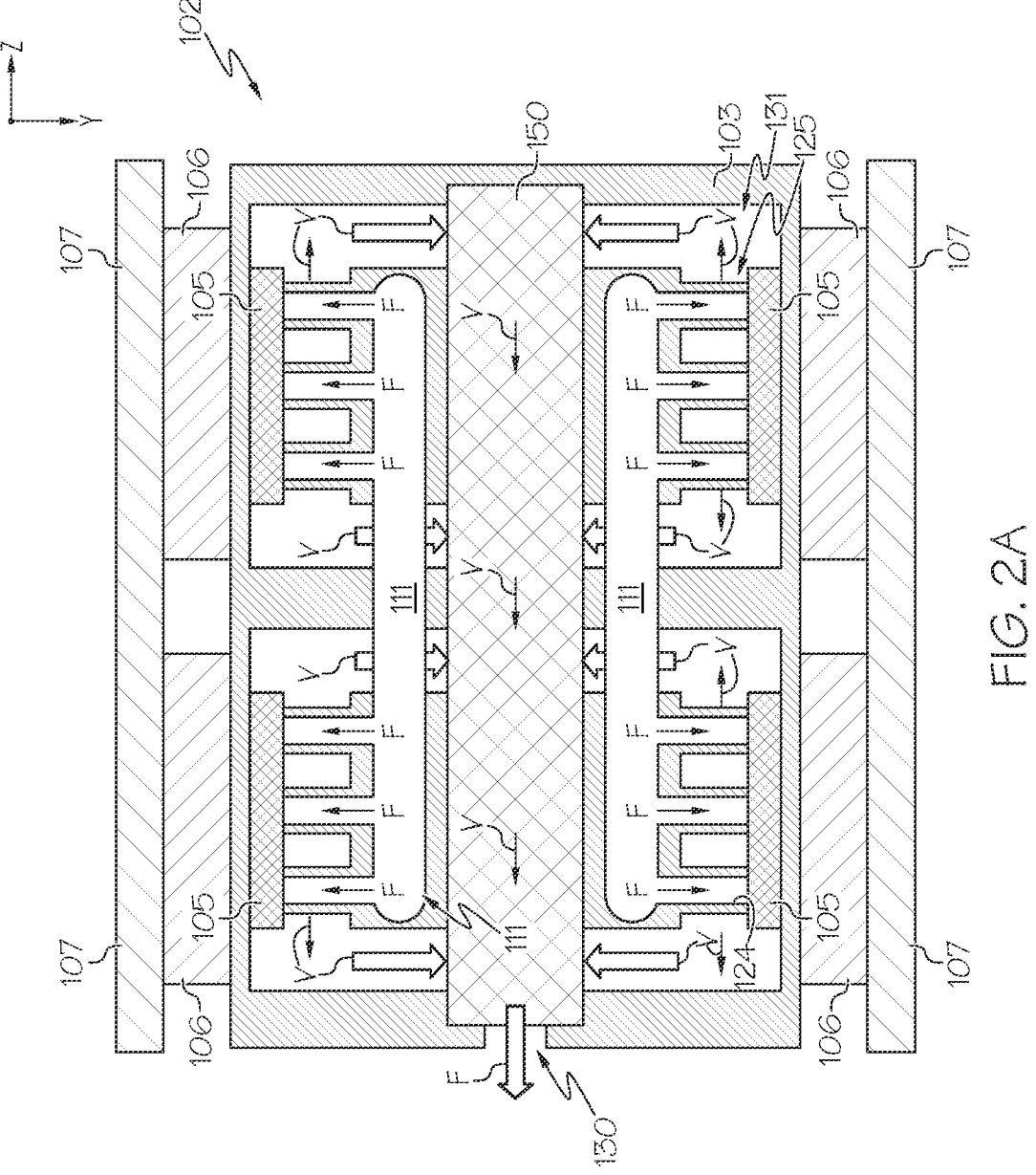
FIG. 2A schematically depicts a cooler assembly of the pump-assisted cooling system of FIG. 1A along line A-A, according to one or more embodiments shown and described herein.

Referring now to FIG. 1C, in yet another embodiment, the system 100 includes a second heat exchanger 160C, a second fluid feed line 110C leading from the second heat exchanger 160C to the cooler assembly 102 and a second fluid outlet line 114 leading from the cooler assembly 102 to the second heat exchanger 160C. A second cooling fluid feeds into a second fluid pathway 113 (FIG. 3A) from the second fluid feed line 110C within the cooler assembly 102 to provide additional cooling to the condenser 150. In such embodiments, the second heat exchanger 160C, second fluid feed line 110C, second fluid outlet line 114, and second fluid pathway 113 has a second cooling fluid separate from the cooling fluid described above and running through the pump 104.

Referring now to FIG. 1D, in another embodiment, the system 100 includes a set of fins 148, as described in greater detail below, structured to increase the surface in contact with vapor in order to increase condensation in the condenser 150 (FIG. 4A) within the cooler assembly 102.

Figure 2B:
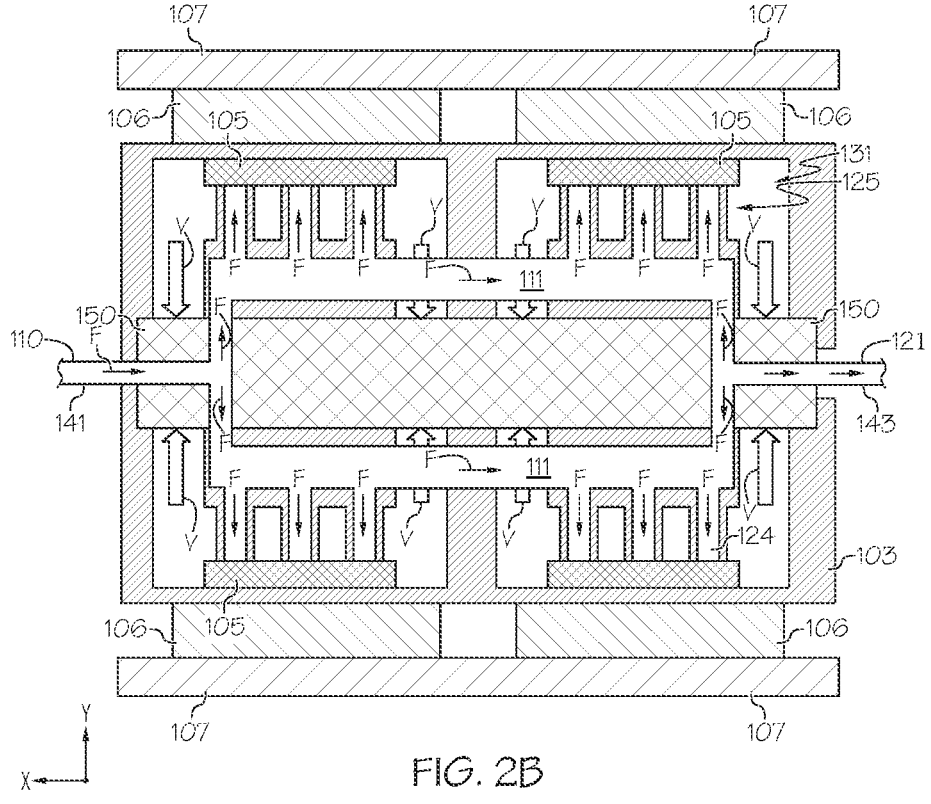
FIG. 2B schematically depicts a cooler assembly of the pump-assisted cooling system of FIG. 1A along line B-B, according to one or more embodiments shown and described herein.

Referring now to FIGS. 2A and 2B, an example cooler assembly 102 of the pump-assisted cooling system 100 of FIG. 1A along lines A-A and B-B are depicted. The cooler assembly 102 comprises a housing 103 including a fluid inlet 141 and fluid outlet 143, the housing 103 including a fluid pathway 111 between the fluid inlet 141 and fluid outlet 143, a vaporization structure 125, and a condenser 150. In embodiments, a heat generating device 107 is attached to the housing 103 with a bonding substrate 106. As described above, the fluid pathway 111 is fluidly coupled to the fluid feed line 110 and the fluid outlet line 121 such that the cooling fluid flows through the fluid pathway 111 within the housing 103 of the cooler assembly 102. A condenser outlet line 130 fluidly couples cooling fluid output from the condenser 150 to the fluid bypass line 120.

The fluid pathway 111 is disposed over the vaporization structure 125 within the housing 103. The vaporization structure 125 is comprised of a plurality of feeding tubes 124 fluidly coupled to the fluid pathway 111, a wick 105, and one or more vapor outlets 131 fluidly coupling the wick 105 to the condenser 150. The fluid pathway 111 is positioned such that the cooling fluid flowing in the fluid pathway 111 flows over the vaporization structure 125, therefore entering the plurality of feeding tubes 124 and into the wick 105.

The wick 105 is positioned to receive fluid from the plurality of feeding tubes 124 and vaporize the cooling fluid. The wick 105 is positioned near the heat generating devices 107. The heat generating device 107 is thermally coupled to the wick 105. The wick 105 is made of a porous media, such as sintered metal particles (such as copper particles or nickel particles), a metal inverse opal (MIO) structure, or a combination thereof. The porous media facilitates capillary flow of cooling fluid into the vaporization structure 125. In particular, cooling fluid may be drawn into one or more porous feeding posts by a capillary force. In some embodiments, the porous media of the wick 105 may comprise a graded porosity. Thus, cooling fluid is drawn into the vaporization structure 125 via the wick. This allows the cooling fluid to vaporized (e.g., at nucleation sites) and rises into the vapor outlets 131.

In embodiments, the porous structure of the wick 105 provides nucleation sites in the networked pores to allow liquid cooling fluid to boil and change phase from single phase liquid to vapor. By encouraging nucleation of the cooling fluid, the geometry of the plurality of networked pores may assist in transferring thermal energy from the porous structure to the cooling fluid being passed through the porous structure. As the porous structure is thermally coupled to one or more heat generating devices 107 (specifically, one or more high heat components such as power electronics devices), by transferring thermal energy from the porous structure to the cooling fluid, thermal energy from the one or more heat generating devices 107 may be dissipated by way of the porous structure through capillary movement of the cooling fluid. In embodiments where the wick 105 is a MIO structure, the MIO structure may be formed of any suitable metal or metal alloy, polymer, semiconductor, and may be for example, a copper inverse opal (CIO) structure, a nickel inverse opal (NIO) structure, and/or the like.

Still referring to FIGS. 2A and 2B, the housing 103 comprises a vapor outlet 131 fluidly coupling the vaporization structure 125 with the condenser 150. The vapor, as flowing from the wick 105, enters the vapor outlet 131 and flows into the condenser 150. In embodiments, the condenser 150 may be a lattice structure positioned between the vaporization structures 125. Further, in embodiments, the lattice structure of the condenser 150 may be made of any suitable metal, for example, copper, aluminum, steel, titanium, nickel, or the like. The lattice structure of the condenser 150 is configured to provide an increased surface area, allowing the vaporized cooling fluid to condensate.

Figure 3A:
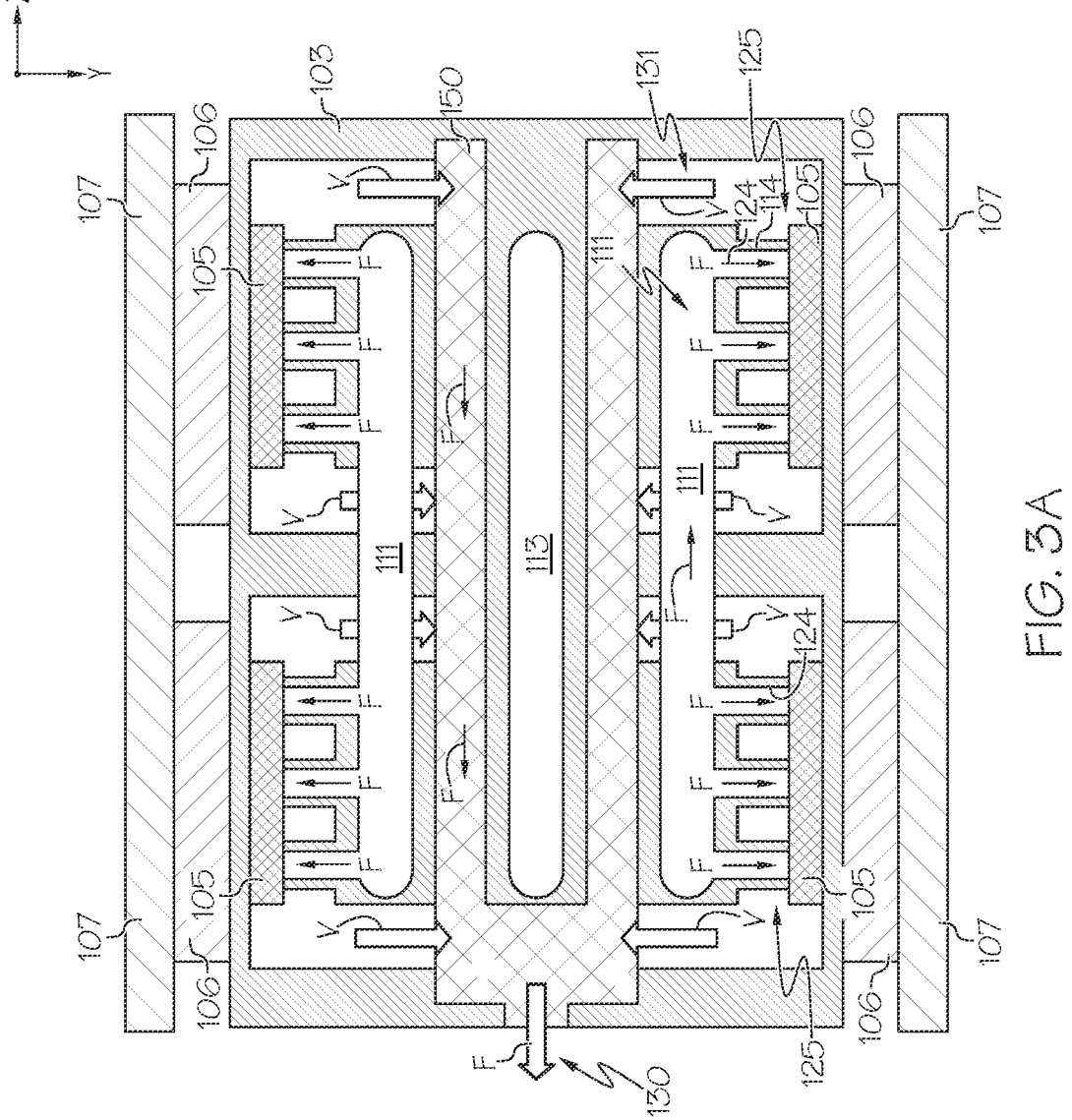
FIG. 3A schematically depicts a cooler assembly of the pump-assisted cooling system of FIG. 1C along line C-C, according to one or more embodiments shown and described herein.
Figure 3B:
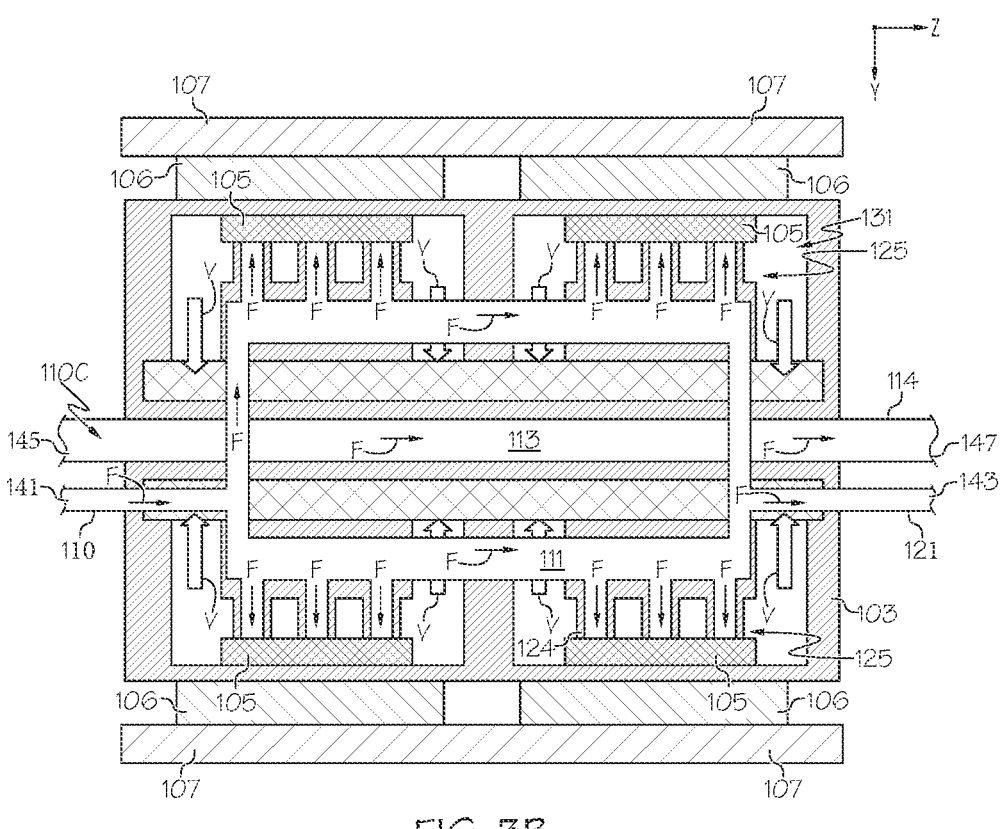
FIG. 3B schematically depicts a cooler assembly of the pump-assisted cooling system of FIG. 1C along line D-D, according to one or more embodiments shown and described herein.

Referring now to FIGS. 3A-3B, an embodiment of the cooler assembly 102 of the pump-assisted cooling system 100 of FIG. 1C along line C-C and D-D, respectively, is depicted. In this embodiment, the housing includes a second fluid inlet 145 and a second fluid outlet 147. The second fluid feed line 110C feeds the cooling fluid into the second fluid pathway 113 within the housing 103 via the second fluid inlet 145, the cooling fluid exiting the second fluid pathway 113 out the second fluid outlet line 114 via the second fluid outlet 147. In embodiments, the second fluid pathway 113 runs between the condenser 150, and is configured to assist the condenser 150 to cooling the cooling fluid and condensate the vapor into liquid. In such embodiments, the second fluid pathway 113 is positioned within the lattice structure of the condenser 150 of the cooler assembly 102.

Figure 4A:
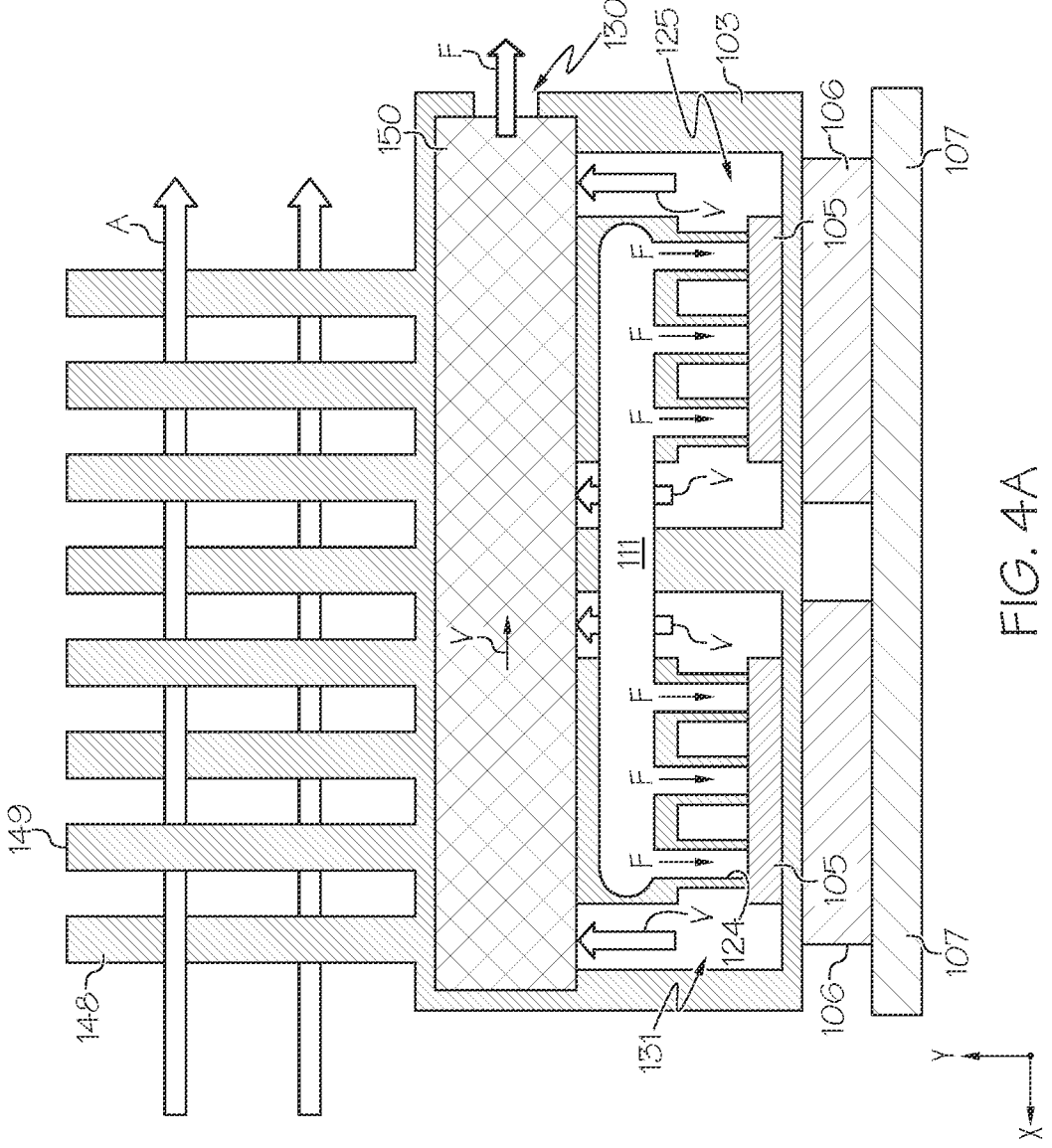
FIG. 4A schematically depicts a cross-sectional view of the cooler assembly of the pump-assisted cooling system of FIG. 1D along line E-E, according to one or more embodiments shown and described herein.
Figure 4B:
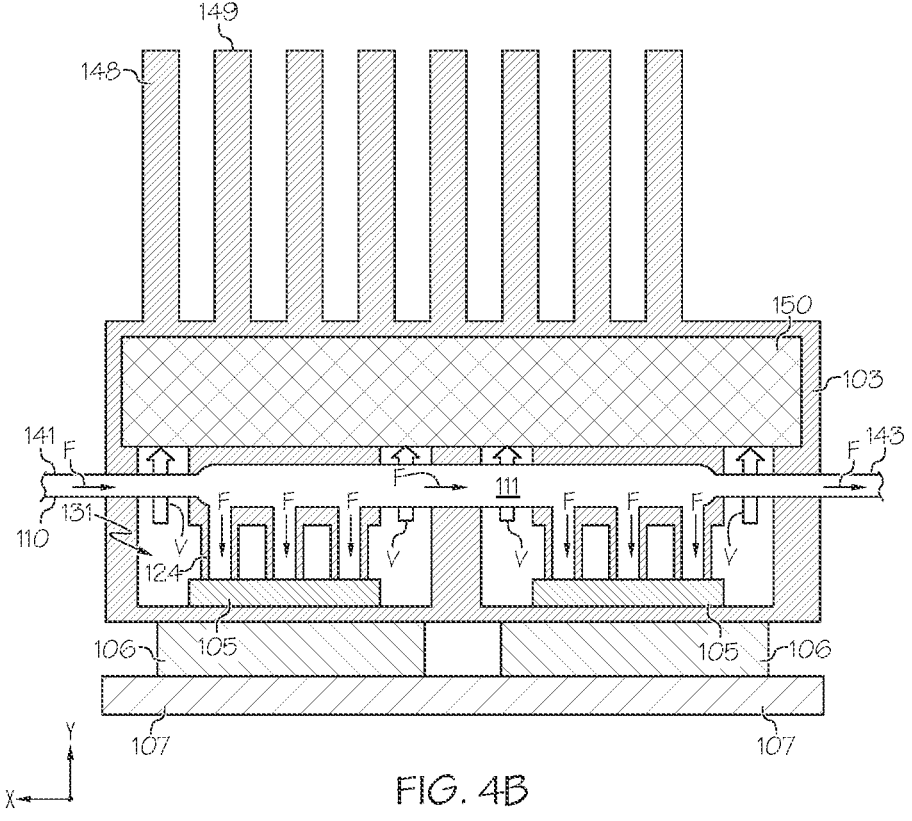
FIG. 4B schematically depicts a cross-sectional view of the cooler assembly of the pump-assisted cooling system of FIG. 1D along line F-F, according to one or more embodiments shown and described herein.

Referring now to FIGS. 4A-4B, another embodiment of the cooler assembly 102 of the pump-assisted cooling system 100 of FIG. 1D along line E-E and F-F, respectively, are depicted. In such embodiments, the system further includes a plurality of fins 148. The fins 148 allow for heat from the fluid to be dissipated more efficiently compared to a condenser without fins 148. The fins 148 are coupled to the condenser 150 within the housing 103, a distal end 149 of the fins 148 extending outside the housing 103. In some of such embodiments, the system 100 may further include a fan to induce airflow A to further cool the fins 148. It should be understood that in above embodiments the condenser 150 is set between pair of vaporization structures 125, one vaporization structure 125 is sufficient.

Referring now to FIGS. 1-4B, in operation, the pump 104 pumps the cooling fluid, which flows through the fluid pathway 111, as a fluid, as shown by the arrows marked F. When flowing along the fluid pathway 111, at least a portion of the cooling fluid enters the vaporization structure 125 via the plurality of feeding tubes 124. In the vaporization structure 125, the cooling fluid enters the wicks 105 by capillary force and vaporizes at a plurality of nucleation sites such that vapor flows into the vapor outlets 131. The now vapor fluid is represented by an arrow marked V. Once vaporized, the vapor enters the condenser 150 via the vapor outlet 131.

Within the condenser 150, the vapor comes in contact with the structure of the condenser 150, the vapor condenses back into a liquid. In embodiments, the vapor is dispelled to the lattice structure sandwiched between the vaporization structures 125. In embodiments, the vapor settles on the surfaced of the lattice structure of the condenser 150. The lattice structure provides increased surface areas to increase the condensation of the cooling fluid vapor. As shown by the arrow F, the cooling fluid is a liquid as the liquid cooling fluid exits through the condenser fluid line 130 and rejoins the fluid bypass line 120.

In some embodiments, the cooling fluid flows through the condenser 150 via the second fluid pathway 113. By flowing through the condenser 150, the cooling fluid assists condense the vapor into liquid. In some of these embodiments, the cooling fluid that flows through the second fluid pathway 113 is the same cooling fluid that runs through the fluid pathway 111. In other embodiments, a second cooling fluid is used. In such embodiments, as described above, a second heat exchanger 160C is used. In embodiments, fins 148 are attached to the condenser 150 to support the cooling of the vapor with external airflow A.

It should now be understood that embodiments described herein may be directed a pump assisted cooling assembly for cooling the one or more heat generating devices, such as power electronic components of an electric vehicle. In particular, the cooler assembly includes a housing including a fluid pathway housed within the housing, a pump, and a heat exchanger. Within the housing, a vaporization structure includes a plurality of feeding tubes that are fluidly coupled to the fluid pathway, a wick, and one or more vapor outlets. Additionally within the housing is a condenser and a condenser outlet line fluidly coupled to a fluid bypass line. Cooling fluid moves from the fluid pathway and into the vaporization structure by moving through the feeding tubes, and into the wicks. The cooling fluid vaporizes within the wicks. The vapor moves into the condenser using vapor outlets wherein the vapor condenses into fluid and exits through the condenser outlet, therefore rejoining the fluid bypass line where the pump can continue to pump the fluid back into the heat exchanger. Thus, the condenser is integrated into the pump assisted cooler to provide minimum system level disruption, achieving high cooling performance while maintaining low pumping power and pressure requirements.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cooling system for cooling electronic devices, the system comprising:
   a pump;
   a heat exchanger fluidly coupled to the pump;
   a cooler assembly comprising:
      a housing;
      one or more heat generating devices thermally coupled to the housing, the housing comprising a fluid inlet and a fluid outlet fluidly coupled to the pump and the heat exchanger via a fluid feed line and a fluid bypass line;
      a fluid pathway housed within the housing, fluidly coupled to the fluid inlet and the fluid outlet;
      at least one vaporization structure comprising a plurality of feeding tubes fluidly coupled to the fluid pathway, a wick, and one or more vapor outlets;
      a condenser housed within the housing; and
      a condenser outlet line fluidly coupled to the fluid bypass line, wherein:

the vaporization structure is configured to induce vaporization of a cooling fluid and facilitate vapor flow into the condenser, and
      the condenser is configured to induce the condensation of the cooling fluid wherein the cooling fluid rejoins the fluid bypass line through the condenser outlet line.

2. The system of claim 1, wherein the condenser is a lattice structure.

3. The system of claim 2, wherein:
   the at least one vaporization structure comprises a pair of vaporization structures; and
   the condenser is positioned between the pair of vaporization structures.

4. The system of claim 1, further comprising a second fluid inlet and a second fluid outlet fluidly coupled to the heat exchanger, and a second fluid pathway housed within the housing, the second fluid pathway fluidly coupled to the second fluid inlet and the second fluid outlet.

5. The system of claim 1, further comprising a second fluid inlet and a second fluid outlet fluidly coupled to a second heat exchanger, and a second fluid pathway housed within the housing, the second fluid pathway fluidly coupled to the second fluid inlet and the second fluid outlet.

6. The system of claim 1, further comprising a plurality of fins extending from the housing configured to support the condensation of the cooling fluid with external airflow.

7. The system of claim 1, wherein the wick comprises sintered metal particles, a metal inverse opal (MIO) structure, or a combination thereof.

8. A capillary cooler assembly comprising
   a housing having a fluid inlet and a fluid outlet;
   one or more heat generating devices thermally coupled to the housing;
   a fluid pathway housed within the housing that is fluidly coupled to the fluid inlet and the fluid outlet and operable to receive a cooling fluid;
   at least one vaporization structure within the housing comprising a plurality of feeding tubes fluidly coupled to the fluid pathway, a wick, and one or more vapor outlets;
   a condenser housed within the housing; and
   a condenser outlet line, wherein;
      the vaporization structure induces vaporization of the cooling fluid and facilitate vapor flow into the condenser, and
      the condenser induces condensation of the cooling fluid wherein the cooling fluid rejoins a liquid bypass line through the condenser outlet line.

9. The capillary cooler assembly of claim 8, wherein the condenser is a lattice structure.

10. The capillary cooler assembly of claim 9, wherein:
   the at least one vaporization structure comprises a pair of vaporization structures; and
   the condenser is positioned between the pair of vaporization structures.

11. The capillary cooler assembly of claim 8, further comprising a second fluid inlet and a second fluid outlet fluidly coupled to a heat exchanger, and a second fluid pathway housed within the housing, the second fluid pathway fluidly coupled to the second fluid inlet and the second fluid outlet.

12. The capillary cooler assembly of claim 8, further comprising a plurality of fins extending from the housing configured to support the condensation of the cooling fluid with external airflow.

13. The capillary cooler assembly of claim 8, wherein the wick comprises sintered metal particles, a metal inverse opal (MIO) structure, or a combination thereof.

14. A vehicle comprising:

one or more heat generating devices;

a pump;

a heat exchanger fluidly coupled to the pump;

a cooler assembly comprising:

a housing, the housing comprising a fluid inlet and a fluid outlet fluidly coupled to the pump and the heat exchanger via a fluid feed line and a fluid bypass line;

a fluid pathway housed within the housing, fluidly coupled to the fluid inlet and the fluid outlet;

a vaporization structure comprising a plurality of feeding tubes fluidly coupled to the fluid pathway, a wick, and one or more vapor outlets;

a condenser housed within the housing; and a condenser outlet line fluidly coupled to the fluid bypass line, wherein:

the vaporization structure is configured to induce vaporization of a cooling fluid and facilitate vapor flow into the condenser, and the condenser is configured to induce the condensation of the cooling fluid wherein the cooling fluid rejoins the fluid bypass line through the condenser outlet line.

15. The system of claim 1, wherein the condenser is a lattice structure.

16. The system of claim 2, wherein the condenser is positioned between a pair of the vaporization structures.

17. The system of claim 1, further comprising a second fluid inlet and a second fluid outlet fluidly coupled to the heat exchanger, and a second fluid pathway housed within the housing, the second fluid pathway fluidly coupled to the second fluid inlet and the second fluid outlet.

18. The system of claim 1, further comprising a second fluid inlet and a second fluid outlet fluidly coupled to a second heat exchanger, and a second fluid pathway housed within the housing, the second fluid pathway fluidly coupled to the second fluid inlet and the second fluid outlet.

19. The system of claim 1, further comprising a plurality of fins extending from the housing configured to support the condensation of the cooling fluid with external airflow.

20. The system of claim 1, wherein the wick comprises sintered metal particles, a metal inverse opal (MIO) structure, or a combination thereof.

\* \* \* \* \*